Feb. 27, 1968   J. B. VAN DER WINDEN   3,370,689
DEVICE FOR PERIODICALLY FEEDING CONTAINERS
TO ADVANCING CARRIERS
Filed July 27, 1965
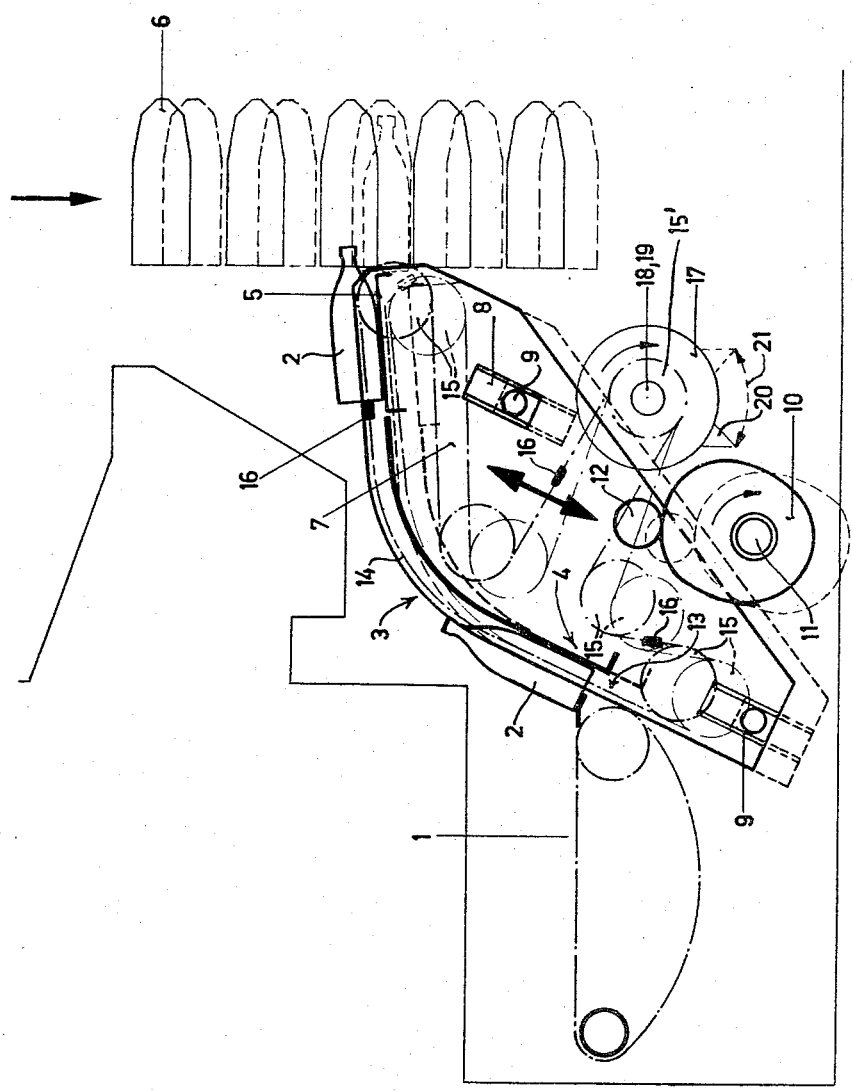
INVENTOR:
JOHANNES BERNARDUS VAN DER WINDEN
BY
Breitenfeld & Levine
Attorneys United States Patent Office 3,370,689
Patented Feb. 27, 1968

3,370,689
DEVICE FOR PERIODICALLY FEEDING CONTAINERS TO ADVANCING CARRIERS
Johannes Bernardus van der Winden, Amstelveen, Netherlands, assignor to Gebroeders Stork & Co.'s Apparatenfabriek N.V., Amsterdam, Netherlands, a limited liability company of the Netherlands
Filed July 27, 1965, Ser. No. 475,055
Claims priority, application Netherlands, July 28, 1964, 64—8,624
5 Claims. (Cl. 198—20)

ABSTRACT OF THE DISCLOSURE

A container handling machine includes a container supply, a continuously moving series of carriers, and a transit conveyer delivering containers from the supply to the carriers. Transit conveyer reciprocates so that during each stroke its movement is synchronized with that of the carriers. Conveyors driven via differential gear including torque limiting member.

My invention relates to a device for periodically feeding containers to continuously advancing carriers such as a feeding device for a bottle cleaning machine and/or sterilisator, or another installation for treatment of bottles, the said device comprising a feeder for the containers, and a transit-conveyor, the latter being situated between this feeder and the advancing carriers, the said conveyor having a container receiving and a container delivering station. Such a device is known in various embodiments for installations, in which sometimes the advance of the carriers is discontinuous in order to permit the containers being pushed into the carriers during the period of rest. This solution is, however, disadvantageous in that in such installations the carriers have to be periodically accelerated and slowed down, which naturally complicates the drive of the installation and increases the risk of disturbances. In an installation with continuous advancing carriers, and a stationary feeding device whereby the direction of movement of the carriers is mostly vertically downwards directed, there will only be a very short period available for pushing in the containers.

It is a first object of my invention to provide a feeding device in which the above difficulties are not experienced.

It is a further object of my invention to produce periodically a situation in which the delivery station of the transit-conveyor moves along with a carrier, during which period the containers can be pushed into the carrier.

It is a still further object of my invention to obtain a situation in which at the beginning of the pushing movement whereby the containers are introduced into the carriers, the delivery station practically contacts the carrier, whereas at the end of the pushing movement there is obtained a small clearance through which the members, effecting the feeding of the containers, can pass.

An embodiment of the device according to the invention is distinguished in that the movable member has a substantially straight path of movement which encloses a small angle with the track of the carriers, the container receiving station of the transit-conveyor being on a straight part of the path of said conveyor, which part is parallel to the track of the movable member. Due to this feature the drive and guiding of the movable member can be simpler than in the event of a curved track, while at the receiving station no problems arise in relation to the supply of the containers towards the transit-conveyor.

Another object of my invention is to arrange for an exact determination of the time at which the containers should be introduced into the carriers.

Still another object of my invention is to obtain an overload protection.

These and other objects and advantages of my invention will be clarified with reference to the accompanying drawing in which an embodiment of the device according to the invention is diagrammatically represented in side elevation.

The device consists of a supply source 1 for the containers 2. In the embodiment represented this source 1 is constituted by a so-called push table towards a transit-conveyor 3 with a container receiving station 4 and a container delivering or feeding station 5. This transit-conveyor 3 is situated between the supply source 1 and the advancing carriers 6 of the installation which is further not shown in the drawing.

The transit-conveyor 3 is mounted on a movable member 7 which synchronously with the uninterrupted advance movement of the carriers 6 is movable in such a way that the container feeding station 5 of the conveyor 3 regularly performs a movement of which a component is parallel to the path of the carriers 6. In the represented embodiment the movable member 7 has a straight track via the guides 8 which cooperate with rollers 9, the latter being secured to the frame of the installation. The movable member 7 is reciprocated by means of a cam disc 10 which is secured on a shaft 11, the latter being coupled to the drive of the carriers 6. A roller 12 is bearing on the outer circumference of the cam disc 10, the said roller being rotatably mounted on the movable member 7. The position of the guides 8 is such that the track of the member 7 encloses a small angle with the track of the carriers 6.

The container receiving station 4 of the transit-conveyor 3 is situated on a straight part 13 of the path of this conveyor. This part 13 is parallel or almost parallel to the guides 8 and thus parallel to the track of the member 7. In this way the communication between the supply source 1 and the container receiving station 4 is ensured.

The transit-conveyor 3 consists of endless belts or chains 14, movable along a number of guide members 15. The chains 14 are provided with driver members or dogs 16 for conveying the containers 2. One of the guide members 15 viz the member 15', represented on the right at the foot of the drawing, is arranged so as to be independent of the movable member 7. The position of this guide member 15' is such that the required tension in the chains 14 is maintained independent of the movement of the movable member 7. The member 15' constitutes the drive for the chains 14. Due to this feature the drive has a fixed place in the frame of the machine, the endless chains 14 absorbing the relative movement of the conveyor 3 in respect of the frame of the machine. Driving is effected via a differential gear 17 with an input and an output shaft 18, 19 respectively, the third reaction member 20 being provided with a diagrammatically represented adjusting mechanism 21. Built in this adjusting mechanism is a torque limiting member (not shown).

The operation of the device is as follows: the containers 2 of the pushing table 1 are pushed in the direction of the container receiving station 4 of the transit-conveyor 3. When the chains 14 are moving a dog 16 comes at a given moment into contact with the bottom of the container(s) 2 which are dwelling at the container receiving station 4, whereupon these containers are transported in an upward direction as far as the container feeding station 5, which is constructed as a protective frame. This moment is represented in the drawing and the movable member 7 is here in its uppermost position. The roller 12 is lying on the highest part of the cam disc 10. Thereupon the member 7 moves synchronously with the carriers 6 in a downward direction, during which period the containers 2 are pushed by the dog 16 concerned into the carrier 6 which is in front of the container feeding station 5. At the end of this phase the member 7 arrives in the position as represented in dotted lines, the feeding station having slightly moved away from the carrier 6. The dog 16 is hereby conveniently capable to pass through the clearance between the member 7 and the advancing carriers 6.

The moment at which the containers 2 are introduced can be accurately regulated by means of the differential gear 17. By turning the third member 20 of this differential gear the relative angular position between the rotating shafts 18, 19 can be changed and due thereto the phase relation between the movement of the dogs 16 on the one hand and the movable member 7 with the carriers on the other hand.

Since all movements, especially those of the shafts 11, 18 and 19, are coupled to the main drive which propels the carriers 6, all elements are moving synchronously in spite of a possible acceleration of retardation of the main drive. In the event the advance of the transit-conveyor 3 is blocked owing to some obstruction the torque limiting member built in in the adjusting mechanism 21 interrupts the drive, so that an inspection and elimination of the disturbance become possible.

The most important advantage of the invention is that by applying containers in the form of bottles with a swing stopper, each bottle can be moved at an exactly to be determined level before the opening of the carrier. This results in that feeding the bottle no difficulties are experienced in connection with any given position of the swing stopper hanging down from the bottle.

Having now particularly described my invention, what I claim is:

1. In a container handling machine having a container supply source, and a series of continuously moving container carriers:

a transit conveyer including means projecting from said conveyer for pushing containers from the supply source to the carriers during the uninterrupted movement of the latter, a reciprocable member supporting at least a portion of the run of said conveyer, and means for reciprocating said member so that during one stroke of each reciprocation said member and the portion of said conveyer which it carries move in synchronism with said carriers, whereby during said one stroke a container carried by said conveyer may be delivered to one of said carriers.

2. In a container handling machine, the arrangement defined in claim 1 wherein said conveyer comprises at least one endless belt, and including a number of guide rollers about which said belt is trained, one of said rollers being indendent of said reciprocable member, and means for driving said independent roller and hence said belt.

3. In a container handling machine, the arrangement defined in claim 1 wherein the direction of movement of said reciprocating member is arranged at an acute angle with respect to the direction of movement of said carriers, whereby said conveyer moves away from said carriers during each reciprocation of said member to permit one of said projecting members to pass between said conveyor and carriers.

4. In a container handling machine, the arrangement defined in claim 2 wherein said driving means includes a differential gear having an input shaft, an output shaft, and a third reaction member, said independent guide roller being connected to said output shaft, and a source of power connected to said input shaft, whereby the timed relation between the movement aof said conveyer and the movements of said reciprocable member may be varied by adjusting said third reaction member.

5. In a container handling machine, the arrangement defined in claim 4 wherein said differential gear includes a torque limiting member.

References Cited

UNITED STATES PATENTS 3,134,475   5/1964   Di Lella   198—20

FOREIGN PATENTS 1,170,268   5/1964   Germany.

RICHARD E. AEGERTER, *Primary Examiner.*